United States Patent [19]

Schmidt et al.

[11] Patent Number: 4,708,187
[45] Date of Patent: Nov. 24, 1987

[54] TIRE MADE OF CASTABLE OR SPRAYABLE ELASTOMERS

[75] Inventors: Oskar Schmidt, Bruck an der Leitha; Wladislaw Kubica, Hainburg/Donau, both of Austria

[73] Assignee: Lim Kunststoff Technologie Gesellschaft m.b.H., Kittsee, Austria

[21] Appl. No.: 720,095

[22] Filed: Apr. 5, 1985

[30] Foreign Application Priority Data

Apr. 6, 1984 [AT]  Austria ................................. 1181/84
Mar. 26, 1985 [AT]  Austria ................................... 897/85

[51] Int. Cl.$^4$ ............................ B60C 9/00; B32B 5/12
[52] U.S. Cl. .................................... 152/530; 152/526; 152/539; 152/560; 156/123; 156/245

[58] Field of Search ................ 152/452, 510, 525, 526, 152/527, 530, 531, 534, 535, 539, 547, 548, 550, 555, 557, 558, 560, 563, 564; 156/125, 290, 291, 123, 148, 245; 264/258, 259, 263; 425/110, 383, 500

[56] References Cited

U.S. PATENT DOCUMENTS

| | | | |
|---|---|---|---|
| 944,722 | 12/1909 | Eshelman | 152/510 |
| 1,949,057 | 2/1934 | Leguillon | 152/510 |
| 2,587,428 | 2/1952 | Antonson | 152/510 |
| 3,842,883 | 10/1974 | Masson et al. | 152/525 X |
| 4,140,165 | 2/1979 | Lapeyre | 152/452 |

*Primary Examiner*—Donald E. Czaja
*Assistant Examiner*—Thomas Bokan
*Attorney, Agent, or Firm*—Karl F. Ross; Herbert Dubno

[57] ABSTRACT

A tire which is formed by tying a knitted fabric spacer onto the tire mold core, spot welding the belt or other reinforcement to this spacer and then forming the tire body of a castable and/or sprayable elastomer.

6 Claims, 4 Drawing Figures

TIRE MADE OF CASTABLE OR SPRAYABLE ELASTOMERS

FIELD OF THE INVENTION

The present invention relates to a tire made of castable or sprayable elastomers, with radial reinforcement and/or a belt resting on a spacer device towards the interior of the tire and anchored to a bead ring.

BACKGROUND OF THE INVENTION

To reinforce rubber tires, cord is frequently used; the cord can run from one bead ring to the other crosswise to the torus of the tire and can be anchored to these bead rings. Also a belt can be positioned along the circumference. Bead rings, radial reinforcements and belt are held in place by vulcanized rubber, to tire-building process involving first the gluing of non-vulcanized elements to each other, the vulcanization of them so as to form a unit then following. With rubber tires, therefore, the positioning of the reinforcement presents no difficulty.

In tires made from castable or sprayable elastomers reinforcements as known from rubber tires can also be used. Unlike tire building of rubber tires, however, positioning of the reinforcements in these cases is difficult, because the reinforcement must, within the hollow space of the mold, be fixed at a given distance from the core of the mold. It has, for instance, been suggested that the core of the mold can be provided with ribs, or that the radial reinforcement itself can be provided with projections. The production of such tires is relatively complicated and there is also the danger that the tire will be non-homogenous in places.

In some mechanized field work it is important that the tires of the tractors exert as little specific pressure on the ground as possible, so as to avoid damage to the ground. Up to now, to achieve this, rubber tires with the known radial reinforcement anchored to the bead rings have been used; however, the width of the tires was substantially increased, in most cases to nearly double the standard width, and also air pressure was considerably reduced. Although this results in a lower specific ground pressure, the reinforcements of the side walls reach to the anchoring at the bead rings and the side walls still remain stiff which adversely influences the ground pressure.

OBJECT OF THE INVENTION

It is an object of the present invention to provide an improved tire which can be produced more simply, which has a homogeneous composition and which when used as a tractor tire, has nonspecific ground pressure.

SUMMARY OF THE INVENTION

This object is achieved by using as a spacer device for the radial reinforcement and/or the belt, a net which is flexible in all directions. In producing a tire according to the invention the flexible net can simply be drawn over the core of the mold, placing the reinforcement thereon. The reinforcement, in particular the belt, can also be fixed onto the net before the latter is drawn over the core of the mold. The space between the various individual elements of the net is filled with the tire material, so that a high degree of homogeneity will be achieved.

In a particularly effective embodiment of the invention the net consists of a knitted fabric. Although the use of a knitted fabric in the production of tires is already known, in known tires the knitted fabric itself is meant to serve as reinforcement.

The edges of the net can easily be fixed by running a string circumferencially through the edges.

To achieve in tractor tires a low specific ground pressure, the side walls are left without reinforcement and only a belt is used, this takes the stress of the air pressure and tangential forces. According to the invention, it is possible to position the belt without having side wall reinforcements, because the belt lies directly on the net and is spot-bonded, e.g. spot-welded, to the net which reaches into the non-reinforced side-walls of the tire.

In one efficient embodiment of the invention the belt consists of individual sections of cord running parallel to each other and at an oblique angle to the direction of the tire circumference. Here it is of advantage for the belt to have at least two layers positioned one above the other, the direction of the cord sections in one layer being mirrorinverted symmetrically to the direction of the cord sections in the next layer.

To avoid having individual strands of the radial reinforcement lie in dips of the net, it is, according to a further feature of the invention, advantageous for the ribs of the knitted fabric to be run at an angle to the circumference of the tire.

BRIEF DESCRIPTION OF THE DRAWING

The following is a more detailed description of the invention illustrated by two embodiments, reference being made to the accompanying drawing in which.

SPECIFIC DESCRIPTION

Figure 1:
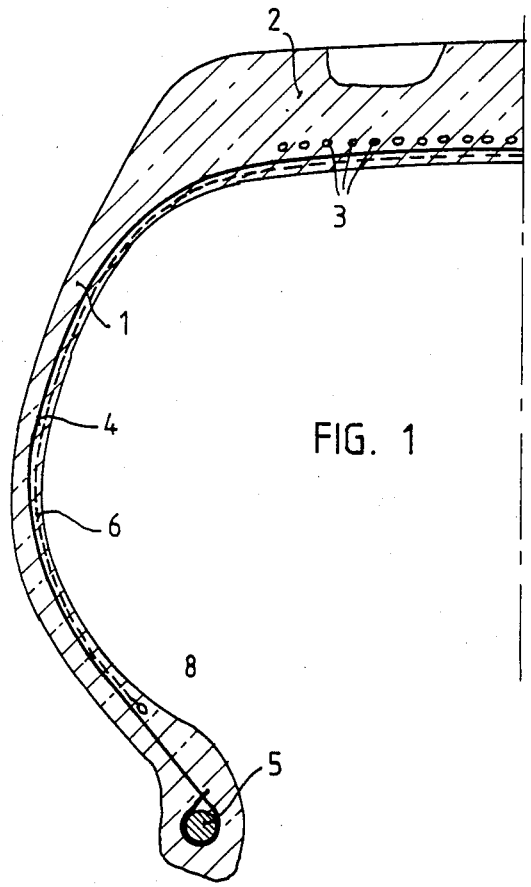
FIG. 1 is a cross section of a vehicle tire according to the invention, with belt and radial reinforcement.

According to FIG. 1 a vehicle tire has a body 1 with a running surface 2. Underneath the running surface 2 there runs a belt 3 and, crosswise to this, a radial reinforcement 4, which is anchored to bead rings 5.

To maintain a spacing from the inner surface of the tire, there is positioned a knitted fabric 6 which is flexible in all directions.

In producing the tire, the flexible knitted fabric 6 is mounted on the core 7 of a mold (FIG. 2) and kept in place on the core 7 of the mold by strings 8 running through the edges of the knitted fabric 6. For this purpose the strings 8 are pulled together, in a similar way as the opening of a pouch would be closed, until the knitted fabric 6 sits closely on the core 7 of the mold. The strings 8 can run either through the last meshes of the knitted fabric or through its border which is turned in and stitched to it.

Figure 2:
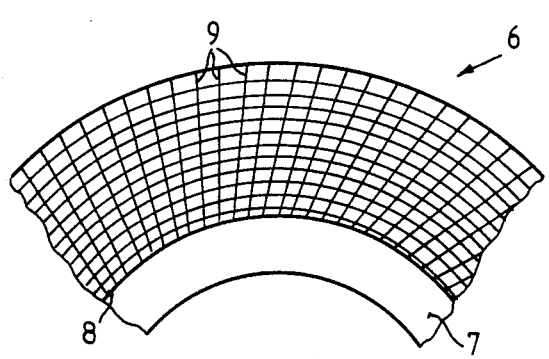
FIG. 2 is a side view showing schematically the net drawn over the core of a mold according to FIG. 1.

When the strings 8 are pulled together, the edges of the knitted fabric 6 are turned in opposite direction to each other in such a way that the ribs 9 of the knitted fabric 6, as may be seen from FIG. 2, run at an oblique angle to the circumference of the core 7 of the mold and of the tire to be produced. By this means it is ensured that the radial reinforcement 4 subsequently mounted will rest at intervals on ribs 9, so that no individual strand of the radial reinforcement will come to lie between two ribs 9, i.e. lower than the adjacent strands.

After the radial reinforcement 4 and possibly the belt 3 has been mounted, the body 1 and/or the running surface 2 are being sprayed or cast in the conventional manner. For this purpose there can be used, for instance, the devices as described in the Austrian Pat. Nos. 339,755, 339,756, and 343,499.

Because of the net or the knitted fabric positioned according to the invention, the radial reinforcement 4 is held everywhere at a suitable distance from the tire inner surface. The elastomer applied will penetrate into the spaces in the net, thus forming a homogenous body of the tire.

Figure 3:
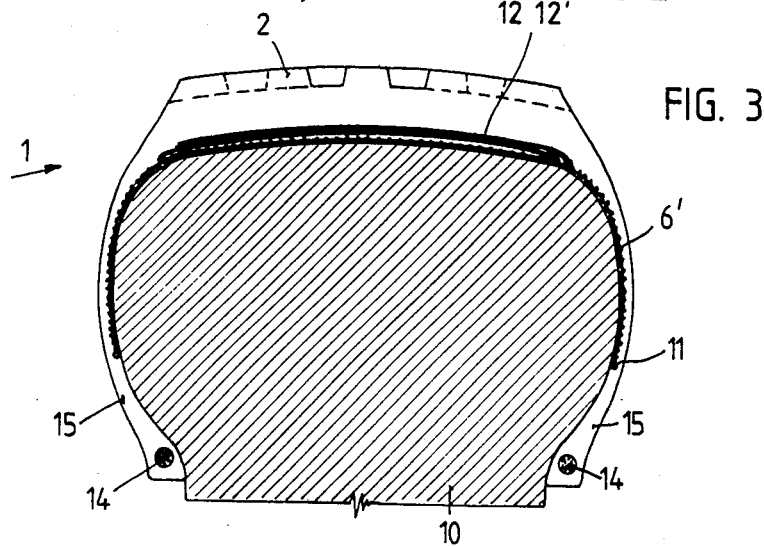
FIG. 3 is a cross section of a tractor tire mounted on a core.
Figure 4:
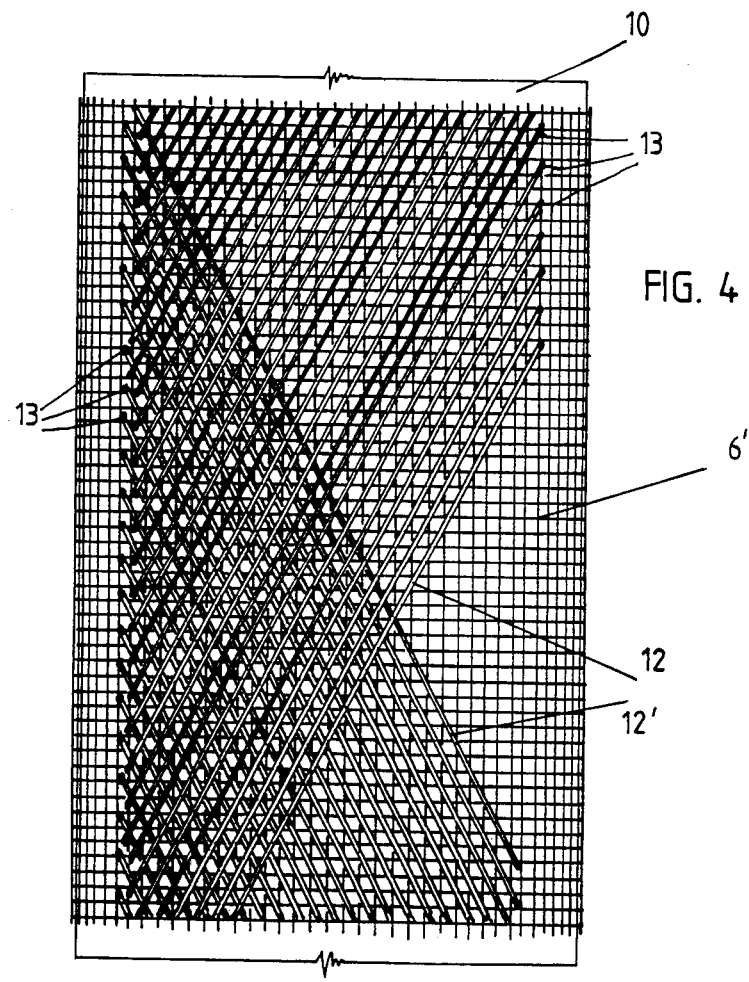
FIG. 4 is a plan view of the net and the belt according to FIG. 3.

According to FIG. 3 and FIG. 4 the knitted fabric 6' is placed on the core 10 of a mold and pulled together by a thread and/or a string 11 at the edge in the same way as in FIG. 1 and FIG. 2. To what extent the knitted fabric 6' should enclose the core 10 of the mold, may be decided from case to case, but it must reach far enough to make for a secure positioning on the core 10 of the mold. Onto the knitted fabric 6' individual sections of cord 12 and 12' are placed in two layers superimposed on each other and spot-bonded to the knitted fabric 6', in particular glued thereto firmly at the ends 13. In each individual layer the cord sections 12 and 12' run essentially parallel to each other; cord sections 12 and 12', however, cross each other, the course of cord sections 12 being mirror-inverted symmetrically to that of cord sections 12'.

The tire has bead rings 14, its side walls 15, however, are not reinforced. This fact, together with a relative wide width of the tire makes it possible to keep the specific ground weight down, making the tire particularly suited as a tractor tire.

The invention offers room for numerous variations. Thus, for instance, in the embodiment according to FIGS. 3 and 4 the mesh of the net and/or of the knitted fabric 6' could be enlarged in steps or continuously in the direction towards the edges of the knitted fabric. Also, the belt consisting of cord sections 12 and 12' could be mounted on the knitted fabric 6' on a device with a torus similar to a core and be prefabricated as an insert capable of being built in, to be mounted on the core of a mould at a later time. The belt itself could also be composed otherwise than of individual cord sections.

We claim:
1. A tire comprising:
a pair of bead rings;
a tire-forming body of an elastomer selected from the group which consists of castable and sprayable elastomers and having a road-engaging portion, side walls extending from said road-engaging portion, and beads along inner edges of said side walls in which said bead rings are embedded;
a tire belt embedded in said body in said road-engaging portion;
a radial reinforcement in said body anchored to said bead rings; and
a spacer in addition to said belt and said radial reinforcement separating same from an inner wall of said body and embedded in said body, said belt lying in direct contact with said spacer, said spacer being solely constituted of a knitted fabric net flexible in all directions and lying immediately radially outwardly in said body from said inner wall while extending in said road-engaging portion and in each of said side walls adjoining said road-engaging portion, said spacer terminating radially outwardly of said beads, said elastomer penetrating into said knitted fabric net so that the net with elastomer penetrating therein holds said belt and said radial reinforcement spaced from interior surfaces of said tire.

2. The tire defined in claim 1 wherein said net is formed with respective strings along respective edges spaced radially outwardly from said beads for enabling said net to be drawn and tightened around a tire mold.

3. The tire defined in claim 1 wherein said reinforcement is spot welded to said fabric net.

4. The tire defined in claim 3 wherein said belt consists of individual sections of cord running parallel to each other and at an oblique angle to the circumference of the tire.

5. The tire defined in claim 4 wherein said belt comprises at least two superposed layers with the cords of one of said layers being oriented mirror-symmetrically with respect to the orientation of the cords of the other of said layers.

6. The tire defined in claim 1 wherein said fabric is formed with ribs extending obliquely to the circumference of the tire.

* * * * *